United States Patent [19]

Rotondo

[11] Patent Number: 5,638,648
[45] Date of Patent: Jun. 17, 1997

[54] WINDOW DOOR STAMPED RADIUS

[75] Inventor: Ronald J. Rotondo, Minneapolis, Minn.

[73] Assignee: Federal-Hoffman, Inc., Anoka, Minn.

[21] Appl. No.: 188,468

[22] Filed: Jan. 27, 1994

[51] Int. Cl.⁶ .................................................. E06B 3/56
[52] U.S. Cl. ................ 52/204.5; 52/204.62; 52/656.5; 52/656.6; 49/501; 312/223.1
[58] Field of Search ............................ 52/213, 204.5, 52/202, 208, 204.62, 776, 656.5, 656.4, 656.2, 656.7, 656.6; 49/501; 312/223.1

[56] References Cited

U.S. PATENT DOCUMENTS

| | | | |
|---|---|---|---|
| 1,725,559 | 8/1929 | Beman | 52/208 X |
| 1,879,302 | 9/1932 | Kelley | 52/656.6 X |
| 2,042,077 | 5/1936 | Stoneback | 52/208 X |
| 2,137,439 | 11/1938 | Bayley | 52/204.5 X |
| 2,272,310 | 2/1942 | Peirson | 52/208 X |
| 2,848,761 | 8/1958 | Hahn | 52/208 |
| 3,210,808 | 10/1965 | Creager | 52/204.705 X |
| 3,286,405 | 11/1966 | Schembri | 52/656.4 |
| 3,425,176 | 2/1969 | Cairns | 52/208 |
| 4,853,055 | 8/1989 | Taylor | 52/208 X |

FOREIGN PATENT DOCUMENTS

| | | | |
|---|---|---|---|
| 675036 | 11/1963 | Canada | 52/235 |
| 424294 | 4/1991 | European Pat. Off. | 52/786.1 |
| 2664645 | 1/1992 | France | 52/208 |
| 37 03 090 | 8/1988 | Germany . | |
| 4-315687 | 11/1992 | Japan | 52/208 |
| 37495 | 3/1954 | Poland | 52/208 |
| 2235007 | 2/1991 | United Kingdom | 52/208 |

*Primary Examiner*—Carl D. Friedman
*Assistant Examiner*—Laura A. Saladino
*Attorney, Agent, or Firm*—Merchant, Gould, Smith, Edell, Welter & Schmidt

[57] ABSTRACT

A door panel for an electronics enclosure or cabinet is disclosed. This door panel includes a window opening, over which is placed a windowpane, anchored to the door panel by bonding material. The bonding material is extruded into a cavity formed by the rearwardly turned edges of the door panel window opening and the overlapping edges of the windowpane. This construction seals the door panel window opening from dust, moisture, or other airborne contaminants, provides an exacting tolerance for anchoring the window in place with very few parts, and enhanced aesthetics.

6 Claims, 2 Drawing Sheets

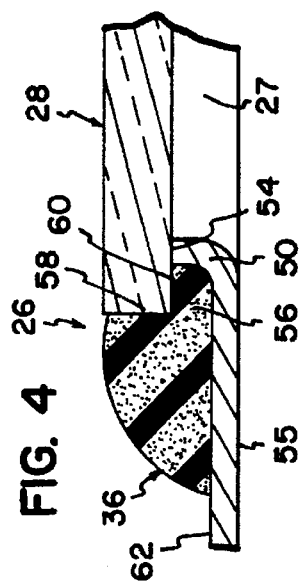
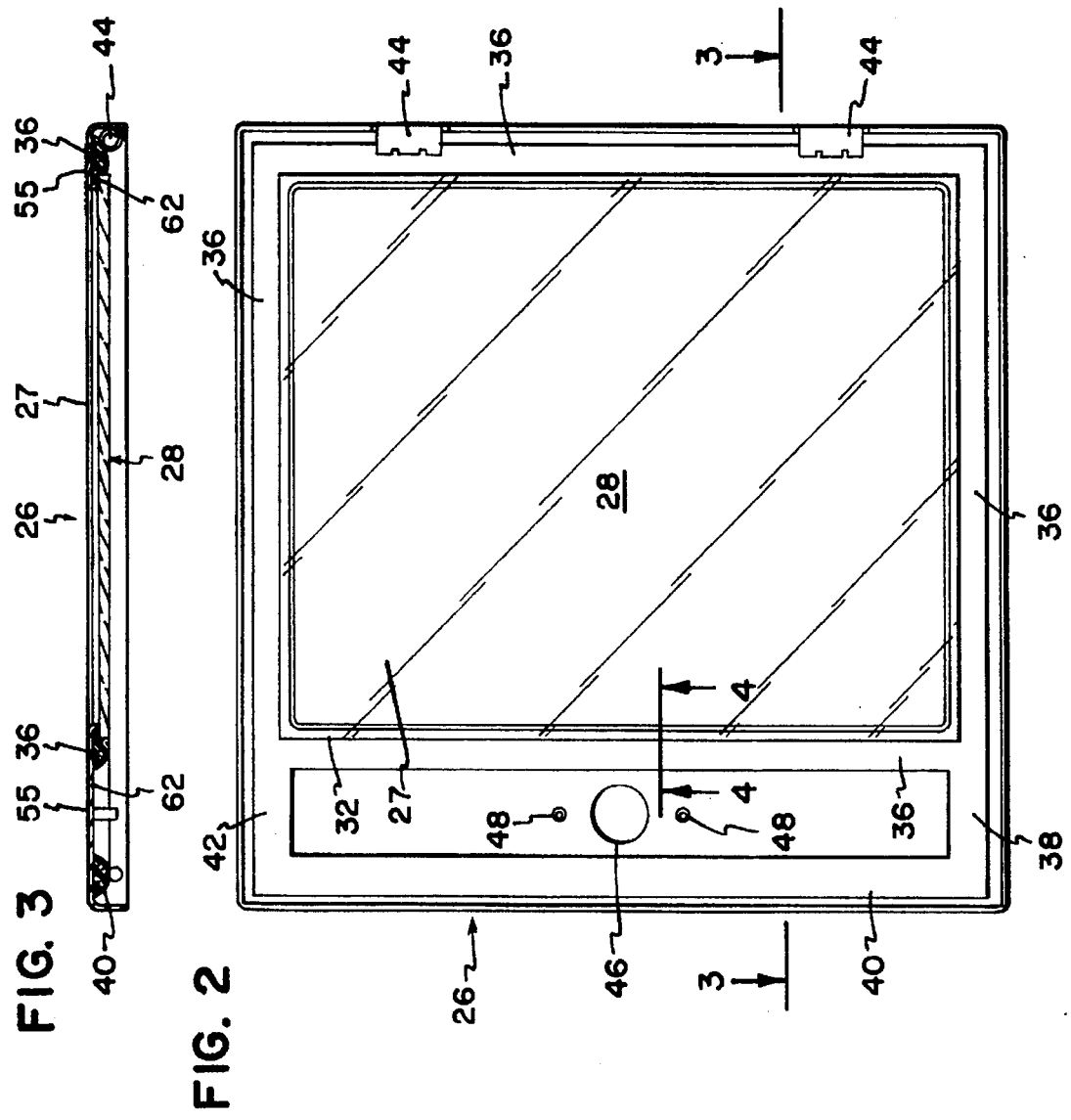

WINDOW DOOR STAMPED RADIUS

FIELD OF THE INVENTION

This invention relates generally to electronics enclosures or cabinets which are impervious to dust, moisture and other airborne contaminants. These cabinets are commonly found in industrial or commercial environments. More particularly, the invention concerns a new construction for the door panels of such enclosures or cabinets.

DESCRIPTION OF THE RELATED ART

Electronic control panels and the electronics associated therewith are extremely sophisticated and sensitive. These control panels are complex, expensive to install and maintain, and are commonly found in industrial settings, such as factories, workshops, warehouses and large commercial buildings such as hotels, office buildings and large apartment buildings. The enclosed panels control large electrical systems such as those involved with lighting, computers, temperature, ventilation, machinery, security, telephones, smoke detection, elevators, etc.

Proper operation of these complex electrical systems is crucial. This is especially true in a commercial environment, as facilities must be run on an energy efficient basis such that energy is conserved whenever possible.

For example, if the electricity is not properly functioning in a high-rise office building, the economic losses suffered may be great as work days are lost and worker productivity decreases. Additionally, if the temperature or light controls are altered, a significant amount of energy may be wasted.

The proper functioning of these control panels can be altered in two main ways. First, these panels may be subjected to unauthorized or unsupervised operation. Second, dust, moisture or other airborne particulate matter may penetrate the control panel and reach the electronics associated therewith. These airborne contaminants may alter the sensitivity of the control panels such that they function improperly, possibly wasting energy.

To combat these problems, cabinets have been developed that are specifically suited to house these electronic control system panels and other similar electronics. These cabinets serve as sealed enclosures for these electronics. They are formed of high grade metal frames and panels made from materials such as steel. The frame and panel members are welded together and sealed at the stress points. The door panels are attached such that when closed, the entire cabinet is impervious to airborne contaminants and moisture to protect the sensitive control panels. These cabinets are usually ventilated to keep the electronics at the proper temperature.

These cabinets commonly include a window in the door panel, enabling the user to view the instrumentation on the control panel without having to open the door and potentially introduce contaminants to the system. The door panel usually includes a lock, to prevent unsupervised or unauthorized access to the enclosed electronics.

In the past, this window was anchored into the door panel upon manufacture, by fitting the window within grooves in the door panel. The window was then sealed within the grooves with gaskets or other sealants to make the door impervious to contaminants. Alternately, the window was placed over an opening in the door and pinned to the door by fasteners and sealed with gaskets or sealants. These windows were further anchored with additional supports or stiffeners.

These window anchoring constructions in the door panels have several drawbacks. First, the window may be placed into the frame such that it is not perfectly straight. Even if placed into the door initially straight, over time, the window may tilt slightly. The tolerance is never exact and the window may feel loose inside the frame or guides, or between the pins. Finally, such a frame may not be aesthetically pleasing for these window anchoring systems involve many separate components, in order to achieve the tight tolerances necessary for enclosures of this type.

SUMMARY OF THE INVENTION

The present invention overcomes the drawbacks of these prior art systems through the provision of a radius in the cabinet door panel, forming a rim at the perimeter of the window opening, such that the windowpane may be placed over the edge of this radius and fastened to the door with a strip of bonding material extruded into the cavity formed by the surfaces of the radius and the overlapping windowpane edges. The resulting arrangement securely anchors the windowpane to the door panel with an almost exact tolerance such that no additional supports or stiffeners are needed. This bonding material in the cavity forms a seal at the window opening against dust, moisture and other airborne contaminants. Furthermore, the strips of bonding material are positioned along the periphery of the door panel such that some portions of it also serve as a gasket or portion of a gasket between the door panel and the cabinet body, sealing the cabinet from moisture and other airborne contaminants. This arrangement of components is aesthetically pleasing as it appears neat and does not involve multiple components.

The present invention is directed to an enclosure door panel for electrical and electronics cabinets. The window opening includes rim portions which extend beyond the plane formed by the rear surface of the door. A windowpane is positioned against the edge surfaces of these rim portions. The windowpane is larger in area than that formed by the rim portions such that its edges extend beyond the rim portion edges. As a result of this configuration, there is a cavity formed by the rear surface of the door panel, the rear surface of the peripheral rim and the overlapping edges of the windowpane. Bonding material is extruded into this cavity to adhere the windowpane to the door and seal the enclosure cabinet from dust, moisture and other airborne contaminants at the door panel around this window opening.

BRIEF DESCRIPTION OF THE DRAWINGS

For a more complete understanding of this invention reference should now be made to the embodiments illustrated in greater detail in the accompanying drawings and described below by way of examples of the invention. In the drawings:

FIG. 2 is a rear view of the enclosure door panel of the present invention.

FIG. 3 is a cross-sectional view of the enclosure door panel taken along line 3—3.

FIG. 4 is a cross-sectional view of the enclosure door panel taken along line 4—4.

Figure 1:
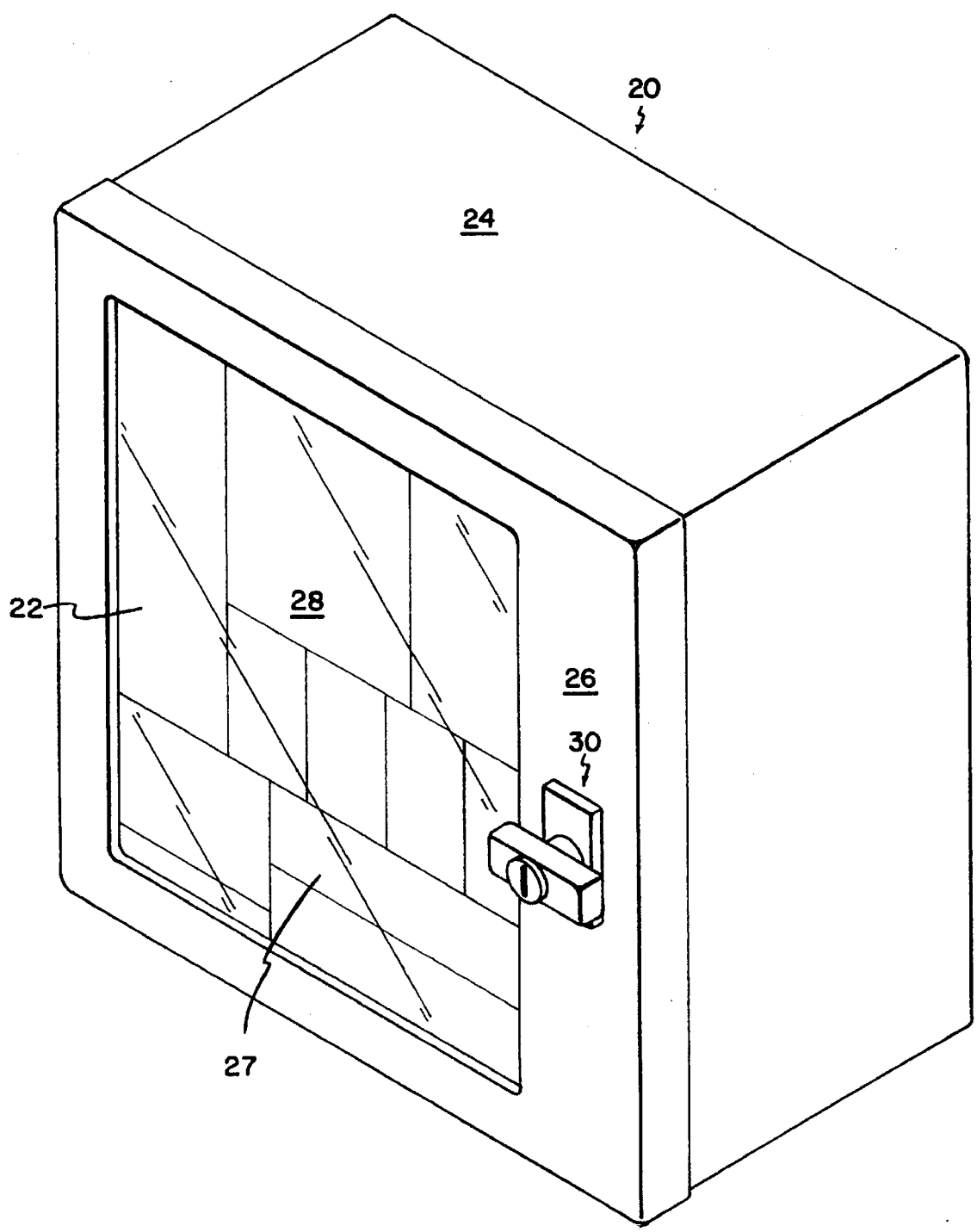
FIG. 1 is a perspective view of a standard electronics enclosure cabinet.

While the invention will be described in connection with a preferred embodiment, it will be understood that these drawing figures are not intended to limit the invention to that embodiment.

DESCRIPTION OF THE PREFERRED EMBODIMENTS

Turning first to FIG. 1, there is shown an electronics enclosure cabinet 20 having the enclosure door window construction of the present invention. The cabinet 20 is usually mounted to walls or other stable structures. The cabinet is designed to house electronic control panels 22, electrical equipment or other electronics in an environment free of dust, moisture or other airborne contaminants. The cabinet 20 includes a body 24, usually of high grade steel or other similar material, to which a door panel 26 is attached, by hinges or other suitable fastening devices. This cabinet 20 is manufactured by techniques well known in the art including welding and steel fastening. The door panel 26 includes a window opening 27 which accommodates a windowpane 28. The door panel 26 also includes a latching mechanism 30, such as a locking handle, which secures the door panel 26 to the cabinet body 24 when closure is desired and provides security against unauthorized access. The cabinet 20 and windowpane 28 are fastened together and constructed such that the enclosed electronics are sealed from dust, moisture and airborne contaminants in accordance with specifications established by organizations such as the National Electronics Manufacturers Association (NEMA), Underwriters Laboratories (UL) or the International Electrotechnical Commission.

FIG. 2 shows the door panel 26 removed from the cabinet. This door panel 26 includes a windowpane 28 placed over a rim 32. This rim 32 is formed by the rearwardly turned portions of the door panel 26, or radi 50 (FIG. 4), at the periphery of the window opening 27. The windowpane 28 is preferably made of polycarbonate, in accordance with conventional specifications for cabinets of this type. However, windowpanes made from acrylic are also sufficient, as these materials also meet NEMA, UL and the International Electrotechnical Commission specifications for use with enclosures of this type.

The windowpane 28 is attached to the door panel 26 by strips 36 of bonding material. These strips 36 extend around the entire perimeter of the window opening 27. The preferred window opening 27 is of a size such that the strips 36 around the perimeter also serve as a gasket or a portion of a gasket, between the cabinet body 24 and door panel 26 where the ends of the windowpane 28 border the ends of the door panel 26. This strip 36 serves as a seal for the cabinet, making it impervious to dust, moisture and other airborne contaminants. Additional strips 38, 40, 42 of bonding material are located along the edges of the door panel 26 not bordered by the windowpane 28. These strips 38, 40, 42 serve as a gasket or a portion of a gasket to seal the cabinet 20 from moisture or other airborne contaminants. While this structural arrangement is preferred in order to economically use bonding material, the door panel 26 may include any size window opening, such that the door panel may have strips of bonding material along its perimeter to serve as a sealing gasket, or portion of a gasket.

The door panel 26 is attached to the cabinet body 24 by hinges 44, or other suitable attachment devices. The door panel 26 also includes an openings 46, 48 for accommodating a latching mechanism such as a handle lock or the like, and structure for mounting the latching mechanism.

Turning now to FIGS. 3 and 4, there is shown the arrangement of the strips 36, 38, 40, 42 of bonding material within the door panel 26 along with the attachment of the windowpane 28. At the window opening 27, peripheral portions of the door panel 26 are rearwardly turned to form radi 50. The radi 50 terminate at edges 54. All of the radi 50 are of the same curvature and extend the same distance rearwardly, such that they are the same height and the edges 54 form a plane substantially parallel to a plane formed by the door panel front surface 55. The windowpane 28 rests on the radius edges 54. The windowpane 28 is sized such that its ends extend a short distance beyond the radius edge 54. This arrangement creates a cavity 56, formed by the radius 50, the windowpane edges 58, 60, and the door panel rear surface 62.

Bonding material is extruded into this cavity 56 to attach the windowpane 28 to the door panel 26. The bonding material forms strips 36 which seal the door panel 26 to the windowpane 28 making the cabinet impervious to dust, moisture and other airborne contaminants. The strips 36 also serve as gaskets or portions of gaskets at points where the windowpane 28 borders the ends of the door panel 26.

The curved radius 50 provides strong structural support for the windowpane while enhancing the aesthetics of the door panel 26. Additionally, the radius 50 serves as a wall to contain the bonding material and control the bonding surface area to create a strong bond between the door panel 26 and the windowpane 28. The radius 50 also provides a controlled height for the bonding material, such that upon extrusion, the bonding material forms arc-shaped self-supporting strips 36.

While a curved radius 50 is preferred, a squared or other similarly shaped radius is also permissible. Additionally, the height of the radius can be adjusted depending on the bond desired, and the bonding material can also be extruded into square or rectangular shaped strips, provided there is sufficient bonding material in the cavity 56 for sufficiently adhering and sealing the door panel 26 to the windowpane 28.

The preferred bonding material is FERMAPOR K-31, a cellular urethane, manufactured by Ernst Sonderhoff GMBH & Co. However, other suitable thermosetting polymers such as silicone rubber, neoprene or urethane may be used for sealing. FERMAPOR K-31 is the preferred bonding material as it does not shrink or break down, or crack significantly over time, such that the windowpane 28 will remain adhered to the door panel 26 and will remain impervious to contaminants over long periods of time.

Strips of bonding material 38, 40, 42 are also placed along the edges of the door panel 26, which do not border the windowpane 28, to form a gasket or a portion of a gasket between the door panel 26 and the cabinet body 24. These strips 38, 40, 42, along with any other strips not used for attaching and sealing the windowpane 28 to the door panel 26, are preferably in an arc or semi-circular shape. However, the bonding material may be extruded along these dimensions in square, rectangular or other equivalent shapes, as long as a sealing gasket or portion thereof is formed.

From the foregoing, it will be seen that there has been brought to the art a new and improved door panel for electronics enclosure cabinets which overcomes the problems in the prior art.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements with the true spirit and scope of the invention.

What is claimed is:

1. An enclosure door window construction, comprising:

(a) a metal door having a front surface, a rear surface and a window opening through said door;

(b) said door having peripheral rim portions around said opening extending outwardly from said rear surface such that said peripheral rim portions terminate at edge surfaces lying in a plane spaced from said rear surface;

(c) a windowpane positioned against said edge surfaces of said peripheral rim portions, having window edge portions extending beyond said edge surfaces of said peripheral rim portions and overlying said rear surface, said window edge portions including window edge surfaces, and forming a peripheral cavity defined by said rear surface, said rim portion and said windowpane; and (d) a bonding material extruded into said cavity and around said windowpane, said bonding material being self-supporting and contacting said window edge surfaces to adhesively bond said windowpane to said door.

2. The enclosure door window construction of claim 1 wherein said plane spaced from said rear surface is substantially parallel to a plane formed by said front surface of said metal door.

3. The enclosure door window construction of claim 1, wherein said bonding material contacts substantially all of said window edge surfaces.

4. The enclosure door window construction of claim 3 wherein said bonding material extends along the entire perimeter of said cavity and said window pane.

5. The enclosure door window construction of claim 1, wherein said bonding material is extruded into said cavity and around said windowpane as a single, continuous strip along substantially all of the entire perimeter of said cavity and said windowpane.

6. The enclosure door window construction of claim 1, wherein said bonding material is extruded into said cavity and around said windowpane as a plurality of strips along substantially all of the entire perimeter of said cavity and said windowpane.

* * * * *